April 7, 1970   L. D. DUNN   3,505,140
APPARATUS AND METHOD FOR LAMINATING CARD-LIKE ARTICLES
Filed April 20, 1966
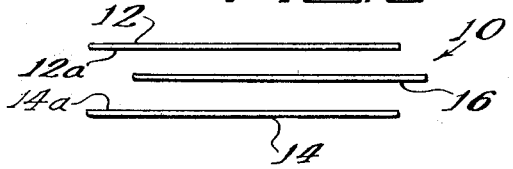
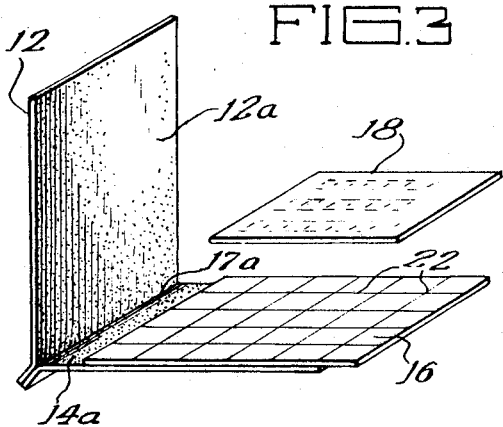
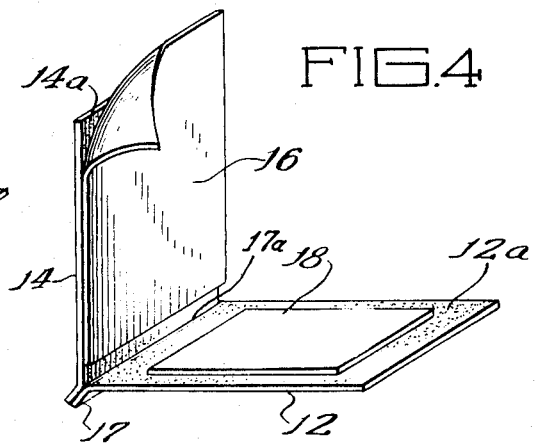
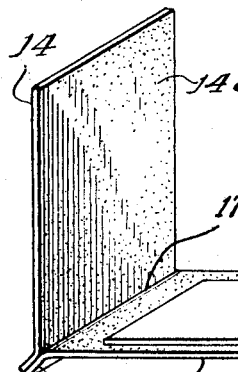
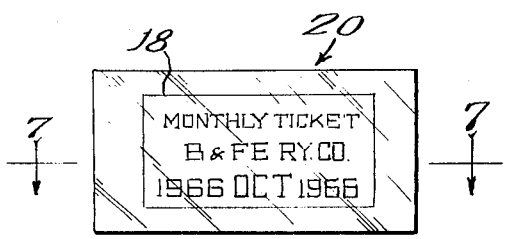
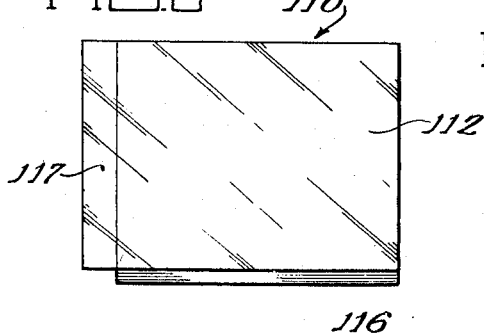
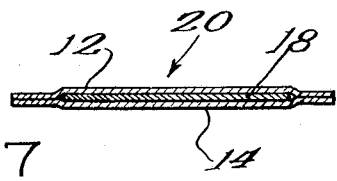
Inventor:
Lyman D. Dunn
By: Hofgren Wegner Allen Stellman & McCord
Attorneys United States Patent Office 3,505,140
Patented Apr. 7, 1970

3,505,140
APPARATUS AND METHOD FOR LAMINATING CARD-LIKE ARTICLES
Lyman D. Dunn, c/o Marlan Company, 325 W. 25th Place, Chicago, Ill. 60616
Filed Apr. 20, 1966, Ser. No. 543,843
Int. Cl. B32b 29/06, 31/16
U.S. Cl. 156—249                                    4 Claims

ABSTRACT OF THE DISCLOSURE

A lamination unit and method of use thereof for laminating card-like articles, the unit comprising a pair of translucent or transparent sheets on either side of a release sheet with the translucent sheets having adhesively coated faces in opposed engagement with the release sheet. The unit is intended to be used by separating one of the transparent sheets from the release sheet and adhering a card-like article to one transparent sheet, following which the release sheet is separated from the other transparent sheet and the other transparent sheet is adhered to the card-like article and any areas of the one transparent sheet beyond the card-like article to laminate the card-like article between the two sheets.

---

This invention relates to an improved structure and a novel method for laminating card-like articles between protective sheets.

Recently mechanisms have been developed and are being publicly used for laminating card-like articles between transparent adhesively coated sheets. Typically, these devices include means for mounting rolls of the adhesively coated transparent material and roller means through which the card-like article is fed and by means of which it is sandwiched or laminated between the oppositely fed transparent sheets. The provision of such machines does not satisfy the many needs for such laminations. For example, it is neither convenient or practical to have such a structure in the home. In addition, there are limitations as to the size of the article which may be laminated.

This invention is directed to a lamination structure and a method of using the same wherein the basic lamination unit may be manually worked upon by an individual to laminate a card-like article therein to produce a lamination similar to that obtained with laminating machines without the assistance of external mechanisms or other non-ambient conditions such as heat or the like.

It is therefore a primary object of this invention to provide a novel lamination structure for facilitating lamination of card-like articles between adhesively coated transparent sheets.

It is another object of this invention to provide a novel method for laminating a card-like article between adhesively coated transparent sheets.

Other objects, features and advantages of the present invention will be apparent from the following description of the preferred embodiments illustrated in the accompanying drawings, in which:

FIGURE 1 is a section view through the lamination unit of this invention;

FIGURE 2 is an exploded view of the lamination unit shown in FIGURE 1;

FIGURE 3 is a view showing the first stage of operation of the lamination unit as a card-like article is inserted therein, after one sheet has been separated from the center sheet of release material;

FIGURE 4 is a view of a second stage of use of the lamination unit of this invention;

FIGURE 5 shows a third stage of use;

FIGURE 6 shows the completed laminated structure resultant from using the method and lamination unit of this invention;

FIGURE 7 is a section view through the completed unit shown in FIGURE 6; and

FIGURE 8 is a top plan view of a modified form of the lamination unit of this invention.

Referring now to the drawings, the lamination unit 10 of this invention includes sheets 12 and 14 which preferably are of a transparent or substantially transparent plastic sheet material. An insert or release sheet 16 is interposed between sheets 12 and 14. It is intended that each of the transparent sheets 12 and 14 will be provided with one face, such as 12a and 14a, respectively, which will be coated with a pressure-sensitive adhesive. The unit 10 will be so assembled so that the adhesively coated faces 12a and 14a face toward each other. Sheet 16 is one commonly known as a "release sheet" having release properties relative to pressure-sensitive adhesives. Such sheets are generally coated with wax-like substances to obtain these release properties. Thus when the lamination unit 10 is assembled with adhesive faces 12a and 14a facing inwardly towards each other, the interposition of release sheet 16 provides a means by which the sheets 12 and 14 may be easily pulled away from the remainder of the lamination to expose the adhesively coated surfaces, normally protected by the remainder of the lamination.

In the preferred embodiment, the insert or release sheet 16 may be staggered relative to the sheets 12 and 14 so as to provide a projecting tab-like end to facilitate grasping and peeling back one of the adhesively coated sheets 12 or 14. Also, the adhesive sheets may have a small portion which adheres to each other at the end 17 opposite from the projection of release sheet 16 to provide a hinge means or a means normally holding the two sheets 12 and 14 directly together, even in the absence of the release sheet 16. Furthermore, the line of adhesion provides an edge 17a against which the card or sheet-like article to be laminated may be initially abutted, if desired, to facilitate initial registration thereof.

The use of this unit is illustrated in FIGURES 3 through 5. One of the adhesively coated sheets, such as sheet 12, is pulled away from the release sheet 16 exposing the adhesively coated face such as 12a. A card-like article 18 may then be juxtaposed face up on the release sheet in a position to contact the adhesively coated face 12a and be adhered thereto.

The next step is the separation of the release sheet 16 from the adhesively coated face 14a of the other transparent sheet 14. Once this is accomplished, as shown in FIGURES 4 and 5, the adhesively coated face 14a of the other sheet 14 is exposed and sheet 14 may be brought into facial juxtaposition with card-like article 18 and sheet 12 to laminate the card therebetween. The finished lamination assembly 20, shown in FIGURES 6 and 7, includes the card-like article which may be completely enclosed within the confines of sheets 12 and 14 and permanently secured therebetween by the adhesive engagement of the adhesively coated faces 12a and 14a which adhere to both faces of the card, as well as to each other in the peripheral areas surrounding the card. Peripheral portions of the finished lamination assembly 20 may be trimmed by the individual user.

It is to be noted that to facilitate in initial registration of the card 18, grid lines 22 (shown in FIGURE 3) may be printed or otherwise formed on release sheet 16 or on one of the adhesive sheets. For decorative purposes, one of the sheets, either 12 or 14, may be given a slight coloration which could provide a decorative border to the card-like article 18 enclosed between the sheets. Also, one of the sheets 12 or 14 could be made of a greater thickness or provided with a greater stiffness than the other sheet in which case, the information bearing face of the card-like article 18 would be positioned to show through the thinner sheet and the reverse side of the card would be substantially obscured by the thicker or stiffer sheet.

FIGURE 8 shows a modified lamination unit 10 including a top sheet 112 similar to sheet 12 and a bottom sheet (not shown) similar to sheet 14. These sheets of unit 112 are adhered to each other along a hinge-like edge 117. Release sheet 116 protrudes exteriorly from one side of unit 110 generally transversely to hinge 117 as opposed to the parallel protrusion of release sheet 16 relative to hinge 17 of unit 10. Release sheet 116 could also protrude outwardly from the side opposite hinge 117 in addition to the lateral protrusion shown.

The lamination unit 10 of this invention may be made in several basic sizes so as to fit small card-like articles, large stationery-size articles, or several other sheet sizes. Therefore, unlike the case with laminating mechanisms, the size of the sheet which may be laminated is relatively unlimited, merely based upon the sizes in which the units 10 are made. Furthermore, these units 10 may be easily and compactly stored in the home or for office use to which the laminating mechanisms are not generally suitably adapted. The original formation of the unit with the adhesive faces in opposed juxtaposition relative to each other means that the non-adhesively coated faces form a self-protecting outer envelope for the unit. This, in combination with the trim, flat configuration of the unit, enhances the storage of these items.

The foregoing detailed description has been given for clearness of understanding only, and no unnecessary limitations should be understood therefrom, as some modifications may be obvious to those skilled in the art.

I claim:

1. A lamination unit for use in manually laminating card-like articles, comprising: a first sheet having an adhesively coated face; a second sheet having releasably coated opposed faces, one of said releasably coated faces being releasably adhered to the adhesive coated face of the first sheet; and a third sheet having an adhesively coated face releasably adhered to the other releasably coated face of said second sheet, said first, second and third sheets being in superposed relation to each other, respectively, and having portions which extend beyond said second sheet and are adhered to each other to provide a hinge means for retaining the first and third sheets together during use whereby, one of said first and third sheets may be separated from said second sheet and a card-like article adhered to the adhesive face thereof, following which the second sheet may be separated from the other of said first and third sheets and the said other of the sheets adhered to the card-like article to laminate the same between the first and third sheets.

2. The lamination unit of claim 1 wherein one of said sheets has a grid line means thereon for facilitating registration of a card-like article during lamination thereof.

3. The method of laminating a card-like article between substantially transparent sheets comprising the steps of: providing a card-like article and providing a lamination unit having substantially transparent sheets, each of which have one adhesively coated face releasably adhered to an interposed release sheet in opposition to each other; separating one of the transparent sheets from the release sheet and adhering the card-like article to the adhesive face of said one of the transparent sheets; separating the other of the transparent sheets from the release sheet; and juxtaposing the adhesive face of the other transparent sheet into adhesive contact with the card-like article and into adhesive contact with the adhesive face of the one transparent sheet in areas beyond the card-like article.

4. The method of laminating the card-like article between substantially transparent sheets comprising the steps of: providing a card-like article and providing a lamination unit having substantially transparent sheets, each of which have one adhesively coated face releasably adhered to an interposed release sheet in opposition to each other; separating one of the transparent sheets from the release sheet, emplacing the card-like article on the release sheet and then placing the separated one transparent sheet into adhesive engagement with the card-like article; subsequently separating the other of the transparent sheets from the release sheet and juxtaposing the adhesive face of the other transparent sheet into adhesive contact with the card-like article in the adhesive face of the one transparent sheet in areas beyond the card-like article.

References Cited

UNITED STATES PATENTS

| | | | |
|---|---|---|---|
| 2,139,377 | 12/1938 | Mull et al. | 161—406 X |
| 2,283,026 | 5/1942 | Yates | 161—406 X |
| 2,788,041 | 4/1957 | Carver | 156—289 X |
| 3,069,793 | 12/1962 | Francescon | 40—2.2 |
| 3,159,516 | 12/1964 | Harris | 156—247 X |

JOHN T. GOULKASIAN, Primary Examiner

J. D. SMITH, Assistant Examiner

U.S. Cl. X.R.

40—2.2; 156—289; 161—40, 406